(12) United States Patent
Lagnado et al.

(10) Patent No.: US 10,658,873 B2
(45) Date of Patent: May 19, 2020

(54) WIRELESS CHARGING DEVICES

(71) Applicant: HEWLETT-PACKARD DEVELOPMENT COMPANY, L.P., Houston, TX (US)

(72) Inventors: Isaac Lagnado, Houston, TX (US); Monji G Jabori, Houston, TX (US); Richard Sweet, Houston, TX (US); Steven Petit, Houston, TX (US); Donald J Cottrell, Jr., Houston, TX (US); Mats Anders Krister Luckman, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/092,121

(22) PCT Filed: Jul. 28, 2016

(86) PCT No.: PCT/US2016/044480
§ 371 (c)(1),
(2) Date: Oct. 8, 2018

(87) PCT Pub. No.: WO2018/022062
PCT Pub. Date: Feb. 1, 2018

(65) Prior Publication Data
US 2019/0207423 A1    Jul. 4, 2019

(51) Int. Cl.
*H02J 50/12* (2016.01)
*H01F 5/00* (2006.01)
*H02J 7/02* (2016.01)
*H02J 7/00* (2006.01)
*H02J 50/10* (2016.01)
*H02J 50/40* (2016.01)
*H02J 5/00* (2016.01)

(52) U.S. Cl.
CPC .............. *H02J 50/12* (2016.02); *H01F 5/003* (2013.01); *H02J 5/005* (2013.01); *H02J 7/0042* (2013.01); *H02J 7/025* (2013.01); *H02J 50/10* (2016.02); *H02J 50/40* (2016.02); *H02J 7/00* (2013.01); *H02J 2207/30* (2020.01)

(58) Field of Classification Search
CPC .. H02J 50/12; H02J 50/10; H02J 50/40; H02J 5/005; H02J 7/0042; H02J 7/025; H02J 2207/30; H02J 7/00; H02J 7/02; H01F 5/003; H01F 5/00
See application file for complete search history.

(56) References Cited

U.S. PATENT DOCUMENTS 9,143,000 B2    9/2015   Leabman et al.
2006/0061326 A1    3/2006   Vine et al.
(Continued)

OTHER PUBLICATIONS

Bq5105xB High-Efficiency Qi v1.1-Compliant Wireless Power Receiver and Battery Charger, Jul. 2012, http://www.ti.com/lit/ds/symlink/bq5105lb.pdf.

*Primary Examiner* — Robert L Deberadinis
(74) *Attorney, Agent, or Firm* — Brooks, Cameron & Huebsch, PLLC

(57) ABSTRACT

Example implementations relate to wireless charging devices. In an example, a wireless charging device includes a housing and circuitry including a power transmitting coil, where the wireless charging device does not include a power amplifier or a power converter.

11 Claims, 4 Drawing Sheets

(56) References Cited

U.S. PATENT DOCUMENTS

| | | |
|---|---|---|
| 2008/0112158 A1* | 5/2008 | Ellis .................. H01M 2/1094 |
| | | 362/158 |
| 2012/0262109 A1* | 10/2012 | Toya .................... H01M 10/44 |
| | | 320/108 |
| 2013/0099563 A1 | 4/2013 | Partovi et al. |
| 2013/0285601 A1 | 10/2013 | Sookprasong et al. |
| 2014/0217970 A1 | 8/2014 | Tabata et al. |
| 2014/0253025 A1 | 9/2014 | Van Wiemeersch et al. |
| 2018/0334050 A1* | 11/2018 | Widmer .................. H02J 50/12 |

* cited by examiner

WIRELESS CHARGING DEVICES

BACKGROUND

Electronic devices such as mobile phones, headphones, tablets, and/or laptops, etc. may utilize rechargeable batteries to provide power to the electronic device. A battery of an electronic device may be wirelessly charged. For example, a wireless charging pad may wirelessly charge a rechargeable battery of an electronic device positioned on and/or near the wireless charging pad.

DETAILED DESCRIPTION

A battery of an electronic device such as a mobile phone, a set of headphones, a table, and/or a laptop, among other types of electronic device include a battery which may be wirelessly charged. As used herein, wireless charging devices refer to electronic devices that can wirelessly charge a rechargeable battery of another electronic device. Wirelessly charging (i.e., wireless charging, wirelessly charge), as used herein, refers to charging a battery of an electronic device in the absence of a wired connection between the electronic device and a source of power external to the electronic device that provide power to charge the rechargeable battery.

For example, a wireless charging mat may wirelessly charge a battery of an electronic device positioned on and/or near the wireless charging mat. Such a wireless charging mat (i.e. a power transfer unit) may include a power transmitting coil and wireless charging support circuitry. The power transmitting coil may transmit power (e.g., inductively) to a battery of an electronic device, while the wireless charging support circuitry may provide functions to the wireless charging mat but itself is not directly utilized for the transmission of power from the wireless charging mat to the battery of the electronic device. Examples of wireless charging support circuitry includes power converters (e.g., direct current to alternating current power converters), power amplifiers, wireless communication modules, processors, and/or memory, along with other potential wireless charging support circuitry.

However, due to the presence of the wireless charging support circuitry, the wireless charging mat may have an undesirably thick profile and/or include a 'bump' (i.e., a thicker portion of profile) in which at least a portion of the wireless charging support circuitry is disposed. That is, some or all of the wireless charging support circuitry (e.g., a power converter and/or a power amplifier) may have a thicker profile than a comparatively less thick profile of a power transmitting coil included in the wireless charging mat.

Examples of the disclosure include wireless charging devices, wireless charging support devices, and wireless charging systems including wireless charging devices and wireless charging support devices. Notably, the wireless charging devices of the disclosure have thinner profiles than other wireless charging devices and/or are without a 'bump' due to an absence of some (e.g., without a power amplifier and/or a power converter, etc.) and/or all wireless charging support circuitry from the wireless charging devices. Additionally, a wireless charging device of the disclosure can include a connector (e.g., a universal serial bus type C connector) to readily couple to a corresponding connector in a wireless charging support device, as described herein.

Figure 1:
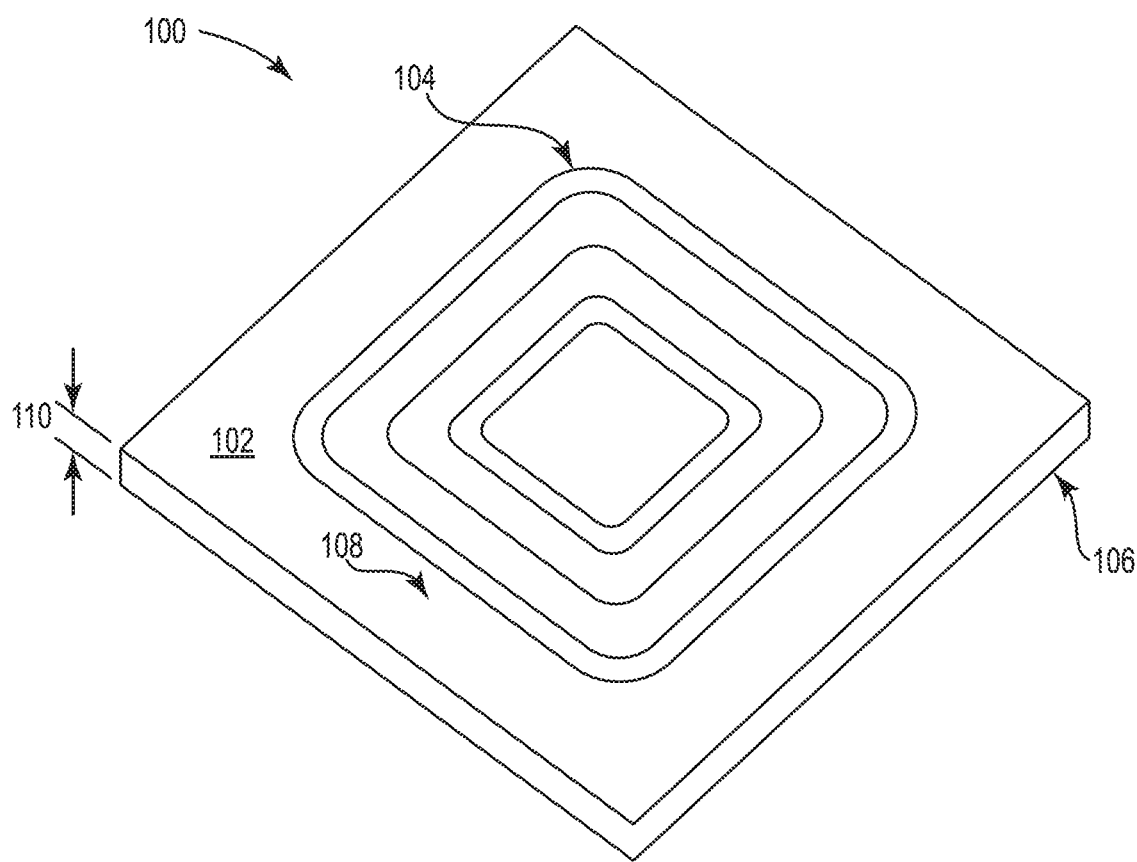
FIG. 1 illustrates a view of an example of a wireless charging device according to the disclosure.

FIG. 1 illustrates a view of an example of a wireless charging device 100 according to the disclosure. As illustrated in FIG. 1, the wireless charging device 100 can include a housing 102, a power transmitting coil 104, and a connector 106.

The housing 102 can form an exterior surface of the charging device 100. In various examples, the housing 102 can form a cavity (not shown) within which the power transmitting coil can be disposed. For instance, in various examples, the power transmitting coil 104 can be entirely disposed within the housing 102. That is, while the power transmitting coil 104 is illustrated as visible in FIG. 1, it is understood that, in various examples, the power transmitting coil 104 is disposed within the housing 102 and not visible to an end user of the wireless charging device 100 (unless the housing were formed of a material that is transparent/semi-transparent).

The housing 102 can be formed of fabric and/or plastic, among other suitable material to promote wireless charging and/or wireless charging devices as described herein. For example, the housing 102 can be formed of a plastic and/or fabric mat including the power transmitting coil 104, among other possibilities.

In various examples, the power transmitting coil 104 can be a resonator coil. As used herein, a resonator coil refers to equipment that can wireless transmit power. Examples of resonator coils include a wire coil and/or a printed circuit board coil. However, the disclosure is not so limited. Rather, the power transmitting coil 104 can include a solenoidal wire, among other suitable types of power transmitting coils to wireless transmit power to an electronic device. For instance, in some examples, the power transmitting coil 104 can be formed of two or more types of devices/power transmitting coils (e.g., a resonator coil and a solenoidal wire), among other possibilities.

As illustrated in FIG. 1, the housing 102 can include the connector 106. The connector 106 can be a wired connector to couple the wireless charging device 100 to a wireless charging support device via a wire. In various examples, the connector 106 can be a universal serial bus connector (USB) such as USB type C connector or other suitable type of wired connector to promote wireless charging via the wireless charging device 100.

For example, the connector 106 can provide a wired connection whereby power can be delivered to the wireless charging device (e.g., to the power transmitting coil 104) and then the power transmitting coil 104 can wireless charge an electronic device. While FIG. 1 illustrates a total of one connector it is understood that a total number of the connectors can be varied to include fewer or more connectors.

The connector 106 can be a male type connector and/or a female type connector. For example, as illustrated in FIG. 1, the connector 106 can be a female type connector to receive a corresponding male connector. However, in some examples, the connector 106 can be male connector (not shown). For example, the connector 106 can be a male connector that is insertable into a corresponding female connector (not shown). The corresponding female connector can be included in a wireless charging support device (e.g., included in a universal dock), as described herein with respect to FIG. 2.

In some examples, the connector 106 can be retractable with the housing 102. That is, some or all of the connector 106 can be disposed within the housing when the connector 106 is in a retracted position, while at least some of the connector 106 is exposed and extends outwardly from an internal volume of the housing 102 when the connector is in an extended position.

For instance, in some examples the connector 106 can be entirely disposed within the housing 102 when in a retracted position. In this manner, the connector 106 can be selectively moved between a retracted position and an extended position. For example, depending upon the connector 106 can remain at least partially disposed within the housing 102 to protect the connector 106 such as when not in use or the connector 102 can be moved to an extended position when connector 106 is to couple to a corresponding connector, among other possibilities.

Notably, the wireless charging device 100 is illustrated as being absent of wireless charging support circuitry. That is, in some examples, the wireless charging device 100 can include the power transmitting coil 104 but does not include any wireless charging support circuitry. Stated differently, the wireless charging device 100 can including circuitry consisting essentially of the power transmitting coil 104. In some examples, the wireless charging device 100 can include circuitry consisting essentially of the power transmitting coil 104 along with the connector 106 and/or circuitry to supply power from the connector 106 to the power transmitting coil 104, but again does not include additional wireless charging support circuitry.

However, the disclosure is not so limited. Rather, in some examples, the wireless charging device 100 can include some wireless charging support circuitry. For example, the wireless charging device 100 can include some, but not all of a power converter (e.g., a direct current to alternating current power converter), a power amplifier, a wireless communication module, a processor, and a memory. In various examples, the wireless charging device 100 does not include a power amplifier and/or a power converter. In some examples, the wireless charging device 100 without both of a power amplifier and a power converter.

Notably, the wireless charging device 100 has a thinner profile and/or is without a 'bump' as compared to other wireless charging devices due to at least some of the wireless charging support circuitry being absent from the wireless charging device 100. As used herein, the thickness 110 refers to a distance (i.e., profile) between a 'top' surface 108 and a 'bottom' surface (not shown) that is positioned on an opposite side of the wireless charging device 100 from the 'top' surface taken along a plane that is orthogonal to the lop' surface and the 'bottom' surface, as shown in FIG. 1. It is noted that the thickness 110 can be taken at any point along the 'top' surface and/or the 'bottom' surface as the wireless charging device 100 does not include a 'bump'.

For instance, a thickness 110 of the housing 102 of the wireless charging device 100 can be from 3 millimeters to 1 millimeter. All subranges and individual values from 3 millimeters to 1 millimeter are included. For example, the thickness 110 of the housing 102 of the wireless charging device 100 can be from an upper limit of 3 millimeters or 2.5 millimeters to a lower limit of 1.5 millimeters or 1.0 millimeters, among other possible values.

In some examples, a thickness 110 of the housing 102 of the wireless charging device 100 can be from 1 millimeter to 0.2 millimeters. All subranges and individual values from 1.0 millimeter to 0.2 millimeters are included. For example, the thickness 110 of the housing 102 of the wireless charging device 100 can be from an upper limit of 1.0 millimeters or 0.7 millimeters to a lower limit of 0.4 millimeters or 0.2 millimeters, among other possible values.

Additionally, while the wireless charging device is described above as having a housing with a particular thickness, it is understood that in some examples, a power transmitting coil 104 can be without any housing, or can be used with just a partial housing (bottom housing, but not a top housing such the power transmitting coil is partially but not completely encompassed by such as housing). For example, a partial housing covering a bottom but not a top of the power transmitting coil 104 could be utilized when the power transmitting coil 104 is used under a table and/or desk, among other possibilities. In some examples, it is therefore possible that the thickness 110 equal to and/or not greater than a thickness of the power transmitting coil 104 itself.

Figure 2:
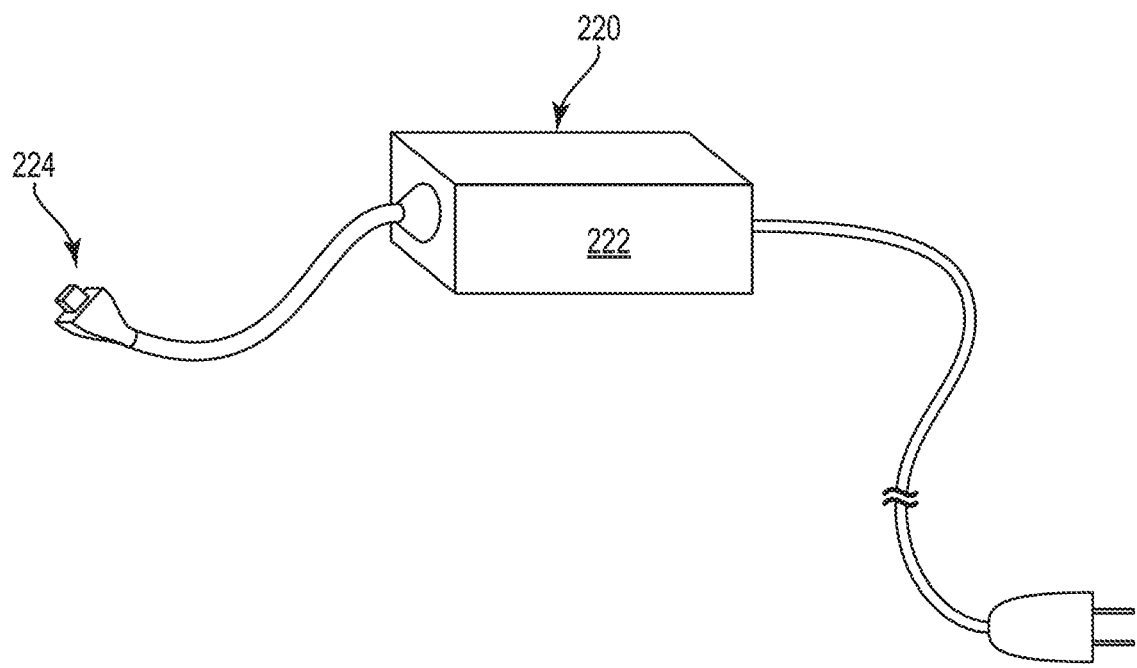
FIG. 2 illustrates a view of an example of a wireless charging support device as a power supply according to the disclosure.

FIG. 2 illustrates a view of an example of a wireless charging support device 220 as a power supply according to the disclosure. As used herein, a power supply refers to a hardware component that supplies power to an electrical device. The power may be supplied in a wired manner, among other possibilities. For instance, as illustrated in FIG. 2, the wireless charging support device 220 can include a housing 222 and a connector 224.

Figure 4:
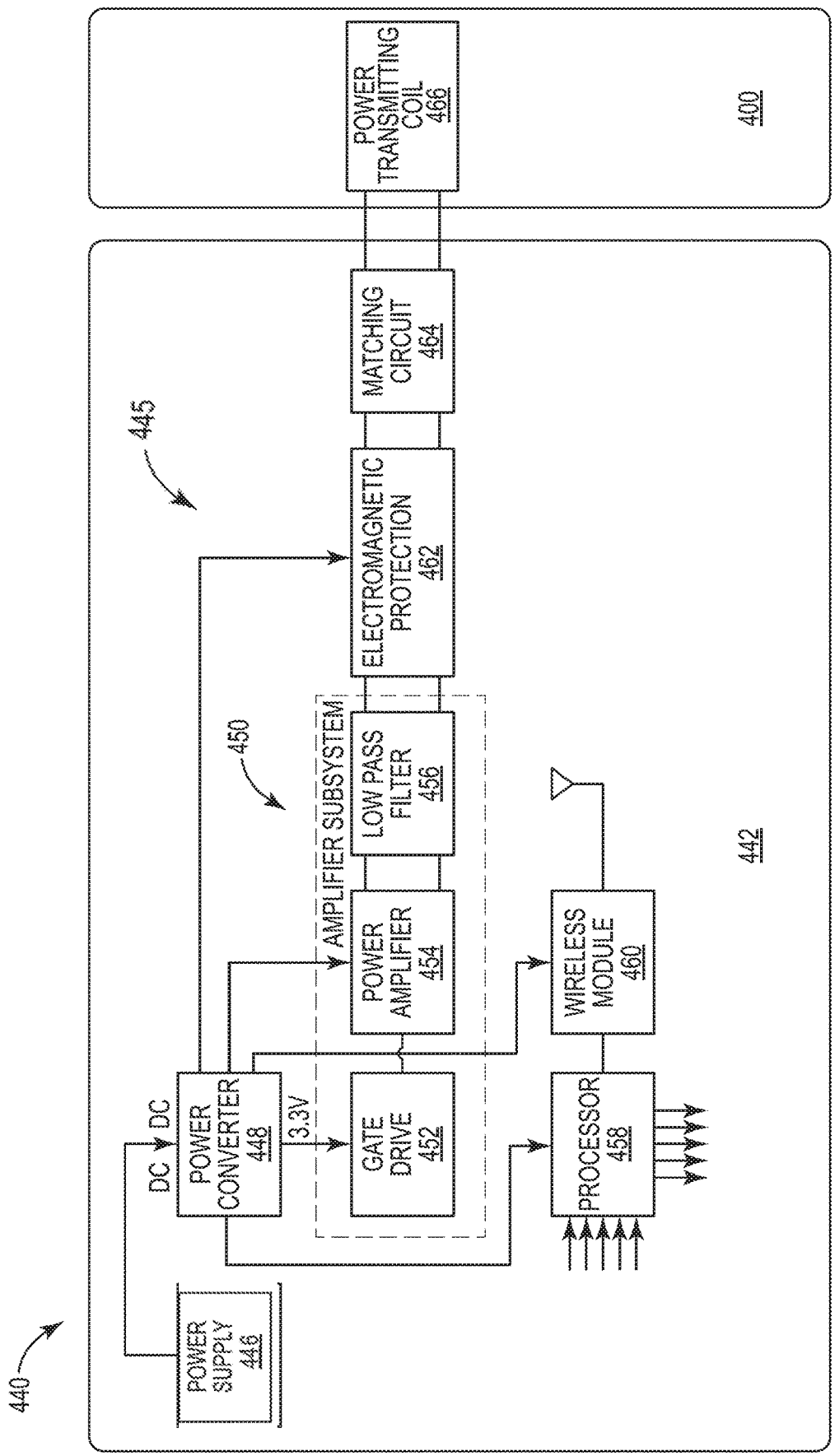
FIG. 4 illustrates a view of an example of a wireless charging system according to the disclosure.

As detailed herein with respect to FIG. 4, it is noted that the wireless charging support device 220 includes at least some wireless charging support circuitry to facilitate wireless charging devices having a reduced amount and/or no wireless charging support circuitry, as described herein. That is, when coupled to a wireless charging device (e.g., the wireless charging device 100 as illustrated in FIG. 1) the wireless charging support device 220 is to provide power and/or various functions to the wireless charging device. For example, the wireless charging support device 220 can provide various functions of wireless charging support circuitry (e.g., a power amplifier, a power converter, and/or power management circuitry etc.) included in the wireless charging support device 220 to the wireless charging device, among other functions.

The housing 222 can be formed of plastic or other suitable material to form a body of the wireless charging support device 220, promote wireless charging, and promote wireless charging devices, as described herein. The connector 224 can be a wired connector, as illustrated in FIG. 2. For example, the connector 224 can be a USB type connector such as a USB type C connector among other possible types of wired connectors. The connector 224 is to couple to a corresponding connector (e.g., connector 106 as describe with respect to FIG. 1) in a wireless charging device.

As illustrated in FIG. 2, the wireless charging support device 220 can be a power supply. The power supply can include an alternative current/direct current power converter.

While the wireless charging support device is described in various examples as comprising a power supply, the wireless charging support device is not so limited. Rather, the wireless charging support device can be a universal dock, among other possibilities. It should also be noted that the inclusion of wireless charging support circuitry within 220, does not preclude the wireless charging support device 220 from being used for other functions. For example, the wireless charging support device 220 can, when used in conjunction with a wireless charging device, supply power to an electronic device; however, the wireless charging support device 220 can also have some detection and switching mechanism that allows it to be used for another function such as a standard notebook charging or USB type C charging. For example, upon detection, switching can be performed by simply bypassing the wireless charging support circuitry and/or functionality related thereto, among other possibilities.

Figure 3:
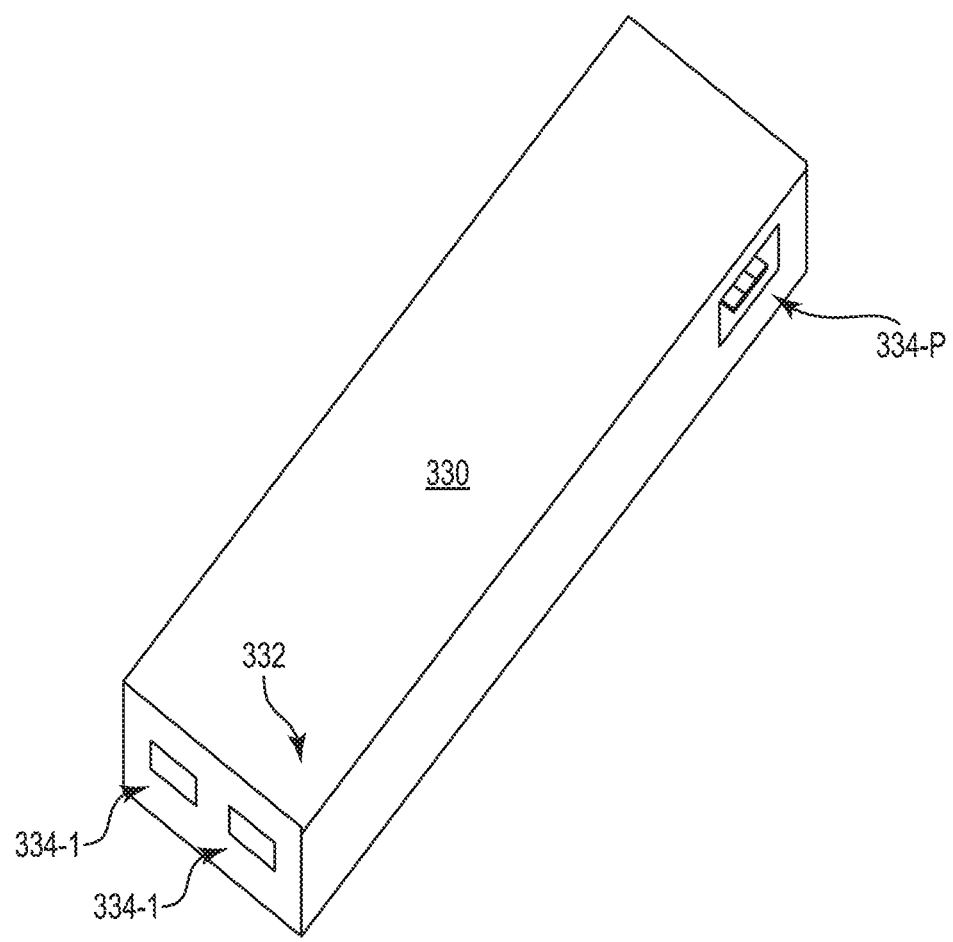
FIG. 3 illustrates a view of another example of a wireless charging support device as a universal dock according to the disclosure.

FIG. 3 illustrates a view of another example of a wireless charging support device 330 as a universal dock according to the disclosure. As used herein, a universal dock refers to a hardware device that includes a plurality of connectors to permit various types of connections between the universal dock and other types of electronic devices. As illustrated in FIG. 3, the wireless charging support device 330 can include a housing 332 and a plurality of wired connectors 334-1, 334-2, . . . , 334-P. While FIG. 3 illustrates a total of three wired connectors the total number of wire connectors can be varied to include more or less wired connectors.

In various examples, the wired connectors 334-1, 334-2, . . . , 334-P include at least two different types of wired connectors. For example, the wired connectors 334-1, 334-2, . . . , 334-P can include a USB connector and a high definition multimedia interface (HDMI wired connector, among other possible types of wired connectors to couple with various types of connectors included in electrical devices such as laptop, mobile phones, etc.

The wired connectors 334-1, 334-2, . . . , 334-P can include male and/or female connectors. However, regardless of a total number and/or type of the wired connectors 334-1, 334-2, . . . , 334-P it is understood that the wireless charging support device includes at least some wireless charging support device analogous and/or similar to wireless charging support circuitry included in the wireless charging support device 220 and as detailed herein with respect to FIG. 4.

In such examples, the wireless charging support device 330 can allow for a wireless charging device (e.g., wireless charging device 100 as illustrated in FIG. 1) to be plugged into a wired connector of the wired connectors, such as 334-P, which can provide power to the wireless charging device. When the wired connector 334-P is not coupled to a wireless charging device, it is understood that the connector 334-P could provide various other functions such as acting as a USB or other function.

FIG. 4 illustrates a view of an example of a wireless charging system 440 according to the disclosure. As illustrated in FIG. 4, the wireless charging system 440 can include a wireless charging support device 442 and a wireless charging device 400.

The wireless charging device 400 is analogous to the wireless charging device 100 as described herein with respect to FIG. 1. In various examples, the wireless charging device 400 does not include a power amplifier or a power converter, as is illustrated in FIG. 4. However, it is noted that in some examples, the wireless charging device 400 can include some wireless charging support circuitry such as the matching circuit 464 and/or the electromagnetic protection 462, but not all wireless charging support circuitry 445.

However, it is noted that in some examples, the wireless charging device 400 does not include any of the wireless charging support circuitry 445 as is illustrated in FIG. 4. As mentioned, the wireless charging device 400 can include a wired connector (not shown) to couple to a corresponding wired connector in the wireless charging support device 442 (not shown), as described herein.

The wireless charging support device 442 can be analogous or similar to the wireless charging support device 220 and/or the wireless charging support device 330 as described with respect to FIG. 2 and FIG. 3, respectively. As illustrated in FIG. 4, the wireless charging support device 442 can include various wireless charging support circuitry 445 such as an alternating current (AC)/direct current (DC) power supply 446, a power converter 448, a power amplifier 450, a processor 458, a wireless communication module 460, electromagnetic shielding (i.e., power transmitting coil protection) 462, and/or a matching circuit 464.

As such, the wireless charging support device 442, when coupled to the wireless charging device 400, can desirably provide various functions of the wireless charging support circuitry 445 to the wireless charging device 400 without such wireless charging circuitry being physically present in the wireless charging device 400. Namely, the wireless charging system 400 can wirelessly charge an electronic device (e.g., a mobile phone, etc.) in proximity of the wireless charging system via the wireless charging support circuitry 445 of the wireless charging support device and the power transmitting coil 466 of the wireless charging device 400.

The AC/DC power supply 446 can convert AC power to DC power. The power converter 448 can convert a voltage and/or amperage of DC power provided from the power supply 446 to at least a different voltage and/or a different amperage. As mentioned, in some examples, the wireless charging support device 442 includes the power converter 448 while the wireless charging device 400 does not include a power converter. As mentioned, the wireless charging support device 442 can, in some examples, itself supply power (e.g., to a notebook, etc.) by bypassing all of the wireless charging support circuitry 445.

The power amplifying subsystem 450 can include a gate drive 452, a power amplifier 454, and/or a low pass filter 456. In some examples, the wireless charging support device 442 includes the power amplifying subsystem 450 while the wireless charging device 400 does not include a power amplifying subsystem.

The processor 458 can be a central processing unit and/or an application-specific integrated circuit (ASIC), among other possible types of processors to promote wireless charging and/or wireless charging devices. In some examples, the wireless charging support device 442 includes the processor 458 while the wireless charging device 400 does not include a processor.

The wireless communication module 460. The wireless communication module 460 can include circuitry to communicate a BLUETOOTH™ signal, a Wi-Fi signal, a ZIGBEE™ signal, a FM signal, or combinations thereof, among other possible types of wireless signals. For instance, the wireless communication module 460 can be a BLUETOOTH™ wireless communication module to communicate BLUETOOTH signals.

In some examples, the wireless charging support device 442 includes the wireless communication module 460 while the wireless charging device 400 does not include a wireless communication module. As used herein, the matching circuit 464 refers to a circuit or combination of circuits that ensures the power transmitting coil 466 has a proper load impedance (e.g., to ensure for desired rate and/or efficiency of power transfer to and/or from the power transmitting coil 466).

It will be understood that when an element is referred to as being "on," "connected to," "coupled to," or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those in the art to practice the examples of this disclosure, and it is to be understood that other examples (e.g., having different thickness) may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 100 may refer to element 100 in FIG. 1 and an analogous element may be identified by reference numeral 400 in FIG. 4.

Elements shown in the various figures herein can be added, exchanged, and/or eliminated so as to provide a number of additional examples of the disclosure. The proportion and the relative scale of the elements provided in the figures are intended to illustrate the examples of the disclosure, and should not be taken in a limiting sense.

As used herein, "a number of" an element and/or feature can refer to one or more of such elements and/or features. Further still, while some elements are designated as a "top" or a "bottom" those in the art will recognize that such elements may correspond to other relative terms or possible orientations in some applications in order to practice the examples of this disclosure

What is claimed:

1. A wireless charging device, comprising:
   a housing having a thickness of 0.2 millimeters to 3 millimeters; and
   circuitry including a power transmitting coil disposed within the housing, wherein the power transmitting coil further comprises a resonator coil, a solenoidal wire, or a combination of a resonator coil and a solenoidal wire, and wherein the wireless charging device does not include a power amplifier or a power converter.

2. The wireless charging device of claim 1, wherein the circuitry consists essentially of the power transmitting coil.

3. The wireless charging device of claim 1, wherein the wireless charging device further comprises a wired connector.

4. The wireless charging device of claim 3, wherein the wired connector is a type C universal serial bus (USB) connector to couple to a corresponding type C USB connector in an external device.

5. The wireless charging device of claim 3, wherein the wired connector is retractable within the housing, wherein the wired connector is entirely disposed within an internal volume of the housing when in a retracted position.

6. A wireless charging support device, comprising:
   a connector to couple to a wireless charging device;
   wireless charging support circuitry including at least a power amplifier or a power converter;
   a power supply including an alternative current/direct current power supply; and
   a universal dock, wherein the universal dock includes a plurality of wired connectors.

7. The wireless charging support device of claim 6, wherein the plurality of wired connectors further comprises at least two different types of wired connectors.

8. A wireless charging system, comprising:
   a wireless charging device including:
      a housing having a thickness of 0.2 millimeters to 3 millimeters;
      a connector; and
      circuitry including a power transmitting coil disposed within the housing; and
   a wireless charging support device including:
      wireless charging support circuitry; and
      a corresponding connector to couple the connector and form the wireless charging system, wherein the wireless charging system is to wirelessly charge an electronic device in proximity of the wireless charging system via the wireless charging support circuitry of the wireless charging support device and the power transmitting coil of the wireless charging device.

9. The wireless charging system of claim 8, wherein the wireless charging support device includes a processor, and wherein the wireless charging device does not include a processor.

10. The wireless charging system of claim 8, wherein the wireless charging support device includes a wireless connection module, and wherein the wireless charging device does not include a wireless connection module.

11. The wireless charging system of claim 8, wherein the wireless connection module includes circuitry to communicate a BLUETOOTH signal, a Wi-Fi signal, a ZIGBEE signal, a FM signal, or combinations thereof.

* * * * *